US010556633B2

(12) United States Patent
Fagnan

(10) Patent No.: US 10,556,633 B2
(45) Date of Patent: Feb. 11, 2020

(54) MOTORIZED SEAT POST AND MOTORIZED STEM FIT DEVICES

(71) Applicant: MAELSTROM INNOVATIONS, Lasalle (CA)

(72) Inventor: Mathieu Fagnan, Lasalle (CA)

(73) Assignee: MAELSTROM INNOVATIONS, Lasalle (CA)

( * ) Notice: Subject to any disclaimer, the term of this patent is extended or adjusted under 35 U.S.C. 154(b) by 252 days.

(21) Appl. No.: 15/607,290

(22) Filed: May 26, 2017

(65) Prior Publication Data

US 2017/0259865 A1    Sep. 14, 2017

Related U.S. Application Data

(63) Continuation of application No. 14/440,546, filed as application No. PCT/CA2013/000942 on Nov. 4, 2013, now Pat. No. 9,663,167.

(60) Provisional application No. 61/721,632, filed on Nov. 2, 2012.

(51) Int. Cl.
| | |
|---|---|
| *F16H 27/02* | (2006.01) |
| *F16H 29/02* | (2006.01) |
| *B62J 1/08* | (2006.01) |
| *B62K 19/36* | (2006.01) |
| *B62K 21/22* | (2006.01) |

(52) U.S. Cl.
CPC ............... *B62J 1/08* (2013.01); *B62K 19/36* (2013.01); *B62K 21/22* (2013.01); *B62J 2001/085* (2013.01)

(58) Field of Classification Search
CPC ................................................... B62K 21/22
See application file for complete search history.

(56) References Cited

U.S. PATENT DOCUMENTS

| | | | |
|---|---|---|---|
| 4,772,069 | A | 9/1988 | Szymski |
| 5,007,675 | A | 4/1991 | Musto |
| 5,346,235 | A | 9/1994 | Holman |
| 6,409,130 | B1 | 6/2002 | Maret |
| 7,905,817 | B2 | 3/2011 | Giannascoli |
| 8,262,115 | B2 | 9/2012 | Mackenroth |
| 8,668,261 | B2 | 3/2014 | Schranz |
| 8,911,012 | B2 | 12/2014 | Choi |
| 8,950,256 | B2 | 2/2015 | Kautz |
| 9,365,252 | B2 | 6/2016 | Legris |

(Continued)

FOREIGN PATENT DOCUMENTS

CA    2599244    2/2008

OTHER PUBLICATIONS

PCT/International Search Report (ISR)—PCT/CA2013/0000942 (Form PCT/ISA/210)—dated Feb. 11, 2014—5 Pages, baxter, Iain.

*Primary Examiner* — Jake Cook
(74) *Attorney, Agent, or Firm* — Benoit & Cote, Inc.; C. Marc Benoit

(57) ABSTRACT

A seat and motorized stem fit device is designed for fitting a cyclist on a bicycle having a seat post and a seat, with the seat post being an original seat post provided by a seat post manufacturer. The motorized seat post fit device comprises a drive assembly and an adjustable seat assembly coupled to the drive assembly and providing an interface between the seat post and the seat. The drive assembly controls the adjustable seat assembly to provide at least one of a vertical displacement and a horizontal displacement of the seat relative to the seat post.

18 Claims, 15 Drawing Sheets

(56) References Cited

U.S. PATENT DOCUMENTS

| | | | |
|---|---|---|---|
| 2004/0232650 A1* | 11/2004 | Felsl | B62J 1/06 |
| | | | 280/283 |
| 2008/0100028 A1* | 5/2008 | Mrdeza | B62K 21/04 |
| | | | 280/280 |
| 2008/0264196 A1* | 10/2008 | Schindler | B62D 1/184 |
| | | | 74/493 |
| 2009/0126211 A1 | 5/2009 | Mandaric | |
| 2011/0185803 A1 | 8/2011 | Demajistre | |
| 2011/0237397 A1 | 9/2011 | Mabey | |
| 2011/0254328 A1 | 10/2011 | Sloan | |
| 2012/0104810 A1 | 5/2012 | Walsh | |
| 2012/0202653 A1 | 8/2012 | Seastrom | |
| 2015/0054319 A1 | 2/2015 | Kim | |
| 2015/0174446 A1 | 6/2015 | Chiang | |
| 2016/0059919 A1 | 3/2016 | Kim | |
| 2016/0075389 A1 | 3/2016 | Ahnert | |

\* cited by examiner

MOTORIZED SEAT POST AND MOTORIZED STEM FIT DEVICES

CROSS-REFERENCE TO RELATED APPLICATIONS

This application claims priority of U.S. provisional patent application 61/721,632, filed on Nov. 2, 2012.

BACKGROUND (a) Field

The subject matter disclosed generally relates to fitting devices used for the purpose of adapting the position of a cyclist on a bicycle. More particularly, the subject matter disclosed relates to seat post and/or motorized stem fit devices which can be adjusted while the cyclist is riding the bicycle.

(b) Related Prior Art

A bicycle needs to be perfectly adjusted (i.e., fitted) to its rider or cyclist, in order to be comfortable, efficient and to avoid injuries. This fit may be obtained by precise position in space of the handlebar and the seat in relation to the bicycle crank axis (i.e., bottom bracket center line). Different tools and protocols exist on the market to determine this optimal position such as, the Guru Dynamic Fit Unit, the Serotta Size Cycle, the Exit fit bike, the Calfee fit bike, the Argon 18/Juteau-Cantin fit bike and the like.

However, all these tools and protocols are static, forcing the cyclist to transfer the obtained position determined by those various tools to his actual bike, thus preventing the cyclist from experiencing the changes in real time on his actual bicycle.

There is therefore a need for a motorized seat post fit device, a motorized stem fit device and a seat and motorized stem fit system that are rideable and that allow to position a seat and a handlebar of a rider/cyclist on the fly (i.e., while riding his bicycle on the road).

SUMMARY

According to an embodiment, there is provided a motorized seat post fit device for fitting a cyclist on a bicycle, the bicycle having a seat post and a seat, the seat post being an original seat post provided with the bicycle, the motorized seat post fit device comprising: a drive assembly; and an adjustable seat assembly coupled to the drive assembly and providing an interface between the seat post and the seat; wherein the drive assembly controls the adjustable seat assembly to provide at least one of: a vertical displacement and a horizontal displacement of the seat relative to the seat post.

According to another embodiment, the drive assembly comprises an actuator for controlling the adjustable seat assembly to provide the horizontal displacement of the seat relative to the seat post.

According to a further embodiment, the adjustable seat assembly comprises a horizontal adjustable seat assembly, the horizontal adjustable seat assembly comprising: a seat mounting element for releasably receiving the seat; and a sliding element slidably mounted at least partially below the seat mounting element for slidably receiving the actuator therein, the actuator being horizontally displaceable between a non-elongated position and an elongated position; wherein when the actuator horizontally moves between its non-elongated position and its elongated position, the sliding element horizontally moves with the actuator, thereby horizontally displacing the seat.

According to yet another embodiment, the adjustable seat assembly further comprises a vertical and horizontal interfacing mounting element mounted on the sliding element at least partially below the seat mounting element for providing an interface between the horizontal adjustable seat assembly and a vertical adjustable seat assembly.

According to another embodiment, the vertical and horizontal interfacing mounting element further comprises: a main portion for interfacing between the sliding element of the horizontal adjustable seat assembly and the vertical adjustable seat assembly; and an external cover slidably mounted on the main portion of the vertical and horizontal interfacing mounting element.

According to a further embodiment, the sliding element comprises parallel sliding bars, each one of the parallel sliding bars being slidably mounted at least partially below the seat mounting element for slidably receiving the actuator in between the sliding bars.

According to yet another embodiment, the drive assembly comprises a motor for controlling the adjustable seat assembly to provide the vertical displacement of the seat relative to the seat post.

According to another embodiment, the adjustable seat assembly comprises a vertical adjustable seat assembly, the vertical adjustable seat assembly comprising: a seat post mounting element adapted to be releasably mounted on the seat post; and a scissor element pivotally mounted at least partially above the seat post mounting element; a worm drive driven by the motor for controlling the scissor element and vertically displacing the seat relative to the seat post, the scissor element being vertically displaceable between a non-elongated position and an elongated position; wherein when the worm drive horizontally moves, at least a portion of the scissor element moves between its non-elongated position and its elongated position, thereby vertically displacing the seat relative to the seat post releasably receiving the seat post mounting element.

According to a further embodiment, the adjustable seat assembly further comprises a vertical and horizontal interfacing mounting element mounted at least partially above the scissor element for providing an interface between the vertical adjustable seat assembly and a horizontal adjustable seat assembly.

According to yet another embodiment, the scissor element comprises a first scissor element and a second scissor element, each one of the first and second scissor elements cooperating with the seat post mounting element and the vertical and horizontal interfacing mounting element on respectively one end of the scissor element, each one of the first and second scissor elements comprising an internal elongated member and an external elongated member pivotally mounted on the internal elongated member.

According to another embodiment, the internal elongated member defines a first end and a second end, the internal elongated member pivotally connecting with the seat post mounting element at its first end and pivotally connecting with the vertical and horizontal interfacing mounting element at its second end and further wherein the external elongated member defines a first end and a second end, the external elongated member connecting with the seat post mounting element at its first end for providing a horizontal displacement of the first end relative to the seat post mounting element and pivotally connecting with the vertical and horizontal interfacing mounting element at its second.

According to a further embodiment, the seat post mounting element comprises seat post rails for releasably receiving the seat post thereon.

According to yet another embodiment, the seat mounting element comprises a seat locking bracket for releasably receiving the seat.

According to another embodiment, the motorized seat post fit device further comprises a controller electrically coupled to the drive assembly for controlling the drive assembly and for collecting coordinates for the at least one of: a vertical displacement and a horizontal displacement of the seat relative to the seat post.

According to a further embodiment, the controller is electrically coupled to the motor and the actuator for controlling the motor and the actuator, for collecting coordinates for the at least one of: a vertical displacement and a horizontal displacement of the seat relative to the seat post, thereby collecting x and y coordinates of the seat relative to the seat post.

According to yet another embodiment, the motorized seat post fit device further comprises a battery electrically coupled to the controller.

According to another embodiment, the motorized seat post fit device further comprises a user interface connected to the controller for making selections relating to the motorized seat post fit device.

According to a further embodiment, the user interface provides x and y coordinates of the seat relative to the seat post and allows the cyclist to modify the x and y coordinates of the seat while riding its bicycle.

According to yet another embodiment, the user interface is electrically connected to the controller via hard wires.

According to another embodiment, the user interface is wirelessly connected to the controller.

According to another embodiment, there is provided a motorized stem fit device for fitting a cyclist on a bicycle, the bicycle having a fork steerer and handlebars, the fork steerer being an original fork steerer provided with the bicycle, the motorized stem fit device comprising: a drive assembly; and an adjustable stem assembly coupled to the drive assembly and providing an interface between the fork steerer and the handlebars; wherein the drive assembly controls the adjustable stem assembly to provide at least one of: a vertical displacement and a horizontal displacement of the handlebars relative to the fork steerer.

According to a further embodiment, the drive assembly comprises a horizontal actuator for controlling the adjustable stem assembly to provide the horizontal displacement of the handlebars relative to the fork steerer.

According to yet another embodiment, the drive assembly comprises a vertical actuator for controlling the adjustable stem assembly to provide the vertical displacement of the handlebars relative to the fork steerer.

According to another embodiment, the adjustable stem assembly comprises a horizontal adjustable stem assembly, the horizontal adjustable stem assembly comprising: a handlebar mounting element for releasably receiving the handlebars; and a sliding element slidably mounted to the handlebar mounting element for slidably receiving the horizontal actuator therein, the horizontal actuator being horizontally displaceable between a non-elongated position and an elongated position; wherein when the horizontal actuator horizontally moves between its non-elongated position and its elongated position, the sliding element horizontally moves with the horizontal actuator, thereby horizontally displacing the handlebars releasably mounted on the handlebar mounting element relative to the fork steerer.

According to a further embodiment, the adjustable stem assembly further comprises a vertical and horizontal interfacing mounting element mounted on the sliding element for providing an interface between the horizontal adjustable stem assembly and a vertical adjustable stem assembly.

According to yet another embodiment, the sliding element comprises parallel sliding bars, each one of the parallel sliding bars being slidably mounted on the handlebar mounting element for slidably receiving the horizontal actuator in between the sliding bars.

According to a further embodiment, the vertical and horizontal interfacing mounting element further comprises: a main portion for interfacing between the sliding element of the horizontal adjustable stem assembly and the vertical adjustable stem assembly; and an external cover slidably mounted on the main portion of the vertical and horizontal interfacing mounting element.

According to yet another embodiment, the adjustable stem assembly comprises a vertical adjustable stem assembly, the vertical adjustable stem assembly comprising: a fork steerer mounting element to be releasably mounted on the fork steerer; and a sliding element slidably mounted to the fork steerer mounting element for slidably receiving the vertical actuator therein, the vertical actuator being vertically displaceable between a non-elongated position and an elongated position; wherein when the vertical actuator vertically moves between its non-elongated position and its elongated position, the sliding element vertically moves with the vertical actuator, thereby vertically displacing the handlebars releasably mounted on the handlebar mounting element relative to the fork steerer.

According to another embodiment, the sliding element comprises parallel sliding bars, each one of the parallel sliding bars being slidably mounted on the handlebar mounting element for slidably receiving the vertical actuator in between the sliding bars.

According to a further embodiment, the handlebar mounting element comprises a handlebar locking bracket for releasably receiving the handlebars.

According to yet another embodiment, the motorized stem fit device further comprises a controller electrically coupled to the drive assembly for controlling the drive assembly and for collecting coordinates for the at least one of: a vertical displacement and a horizontal displacement of the handlebars relative to the fork steerer.

According to another embodiment, the controller is electrically coupled to the horizontal actuator and the vertical actuator for controlling the horizontal actuator and the vertical actuator, for collecting coordinates for the at least one of: a vertical displacement and a horizontal displacement of the handlebars relative to the fork steerer, thereby collecting x and y coordinates of the handlebars relative to the fork steerer.

According to a further embodiment, the motorized stem fit device further comprising a battery electrically coupled to the controller.

According to yet another embodiment, the motorized stem fit device further comprises a user interface connected to the controller for making selections relating to the motorized stem fit device.

According to another embodiment, the user interface provides the cyclist with x and y coordinates of the handlebars relative to the fork steerer and allows the cyclist to modify the x and y coordinates of the handlebars while riding its bicycle.

According to a further embodiment, the user interface is electrically connected to the controller via hard wires.

According to yet another embodiment, the user interface is wirelessly connected to the controller.

According to another embodiment, there is provided a motorized stem and seat post fit system for fitting a cyclist on a bicycle, the bicycle having a fork steerer, a handlebars, a seat and a seat post, the seat post being an original seat post provided by a seat post manufacturer, the fork steerer being an original fork steerer provided by a fork steerer manufacturer, the motorized stem and seat post fit system comprising: a motorized seat post fit device comprising: a drive assembly; and an adjustable seat assembly coupled to the drive assembly and providing an interface between the seat post and the seat; wherein the drive assembly controls the adjustable seat assembly to provide at least one of: a vertical displacement and a horizontal displacement of the seat relative to the seat post; and a motorized stem fit device comprising: a drive assembly; and an adjustable stem assembly coupled to the drive assembly and providing an interface between the fork steerer and the handlebars; wherein the drive assembly controls the adjustable stem assembly to provide at least one of: a vertical displacement and a horizontal displacement of the handlebars relative to the fork steerer.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
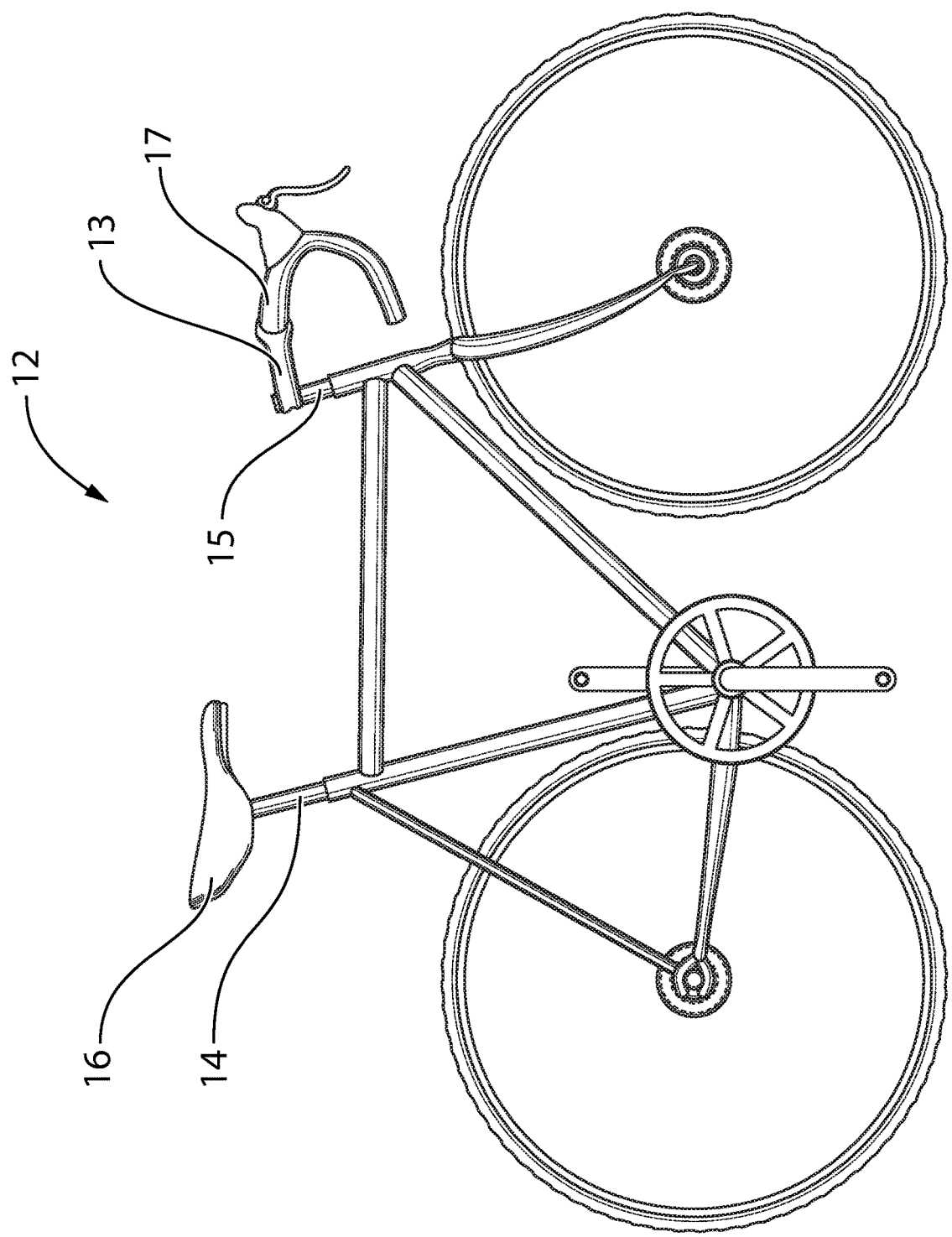
FIG. 1 is a schematic view illustrating a bicycle with a seat post and a stem in accordance with an embodiment.
Figure 2:
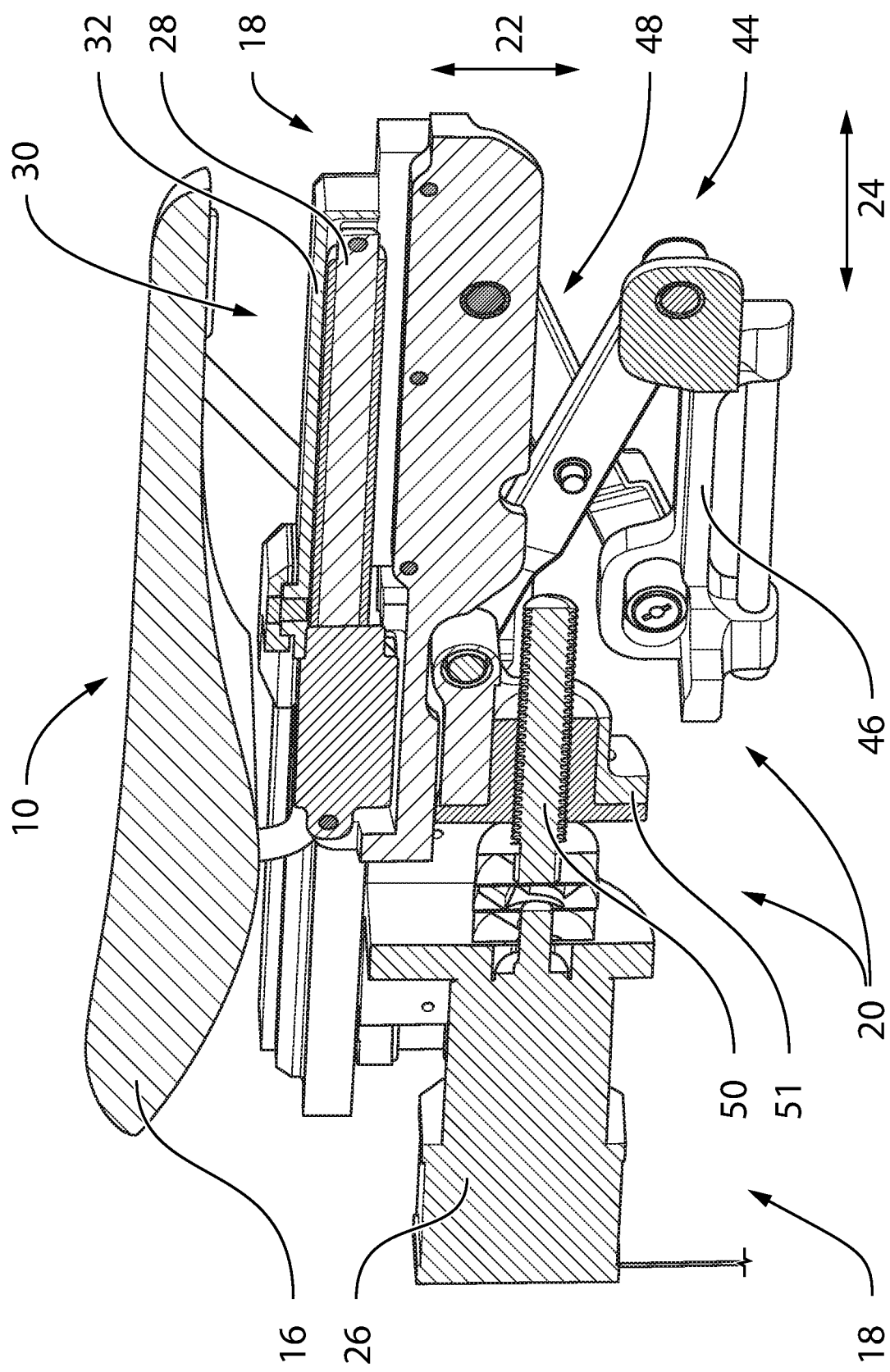
FIG. 2 is an isometric cross sectional view of a motorized seat post fit device in accordance with an embodiment.
Figure 3:
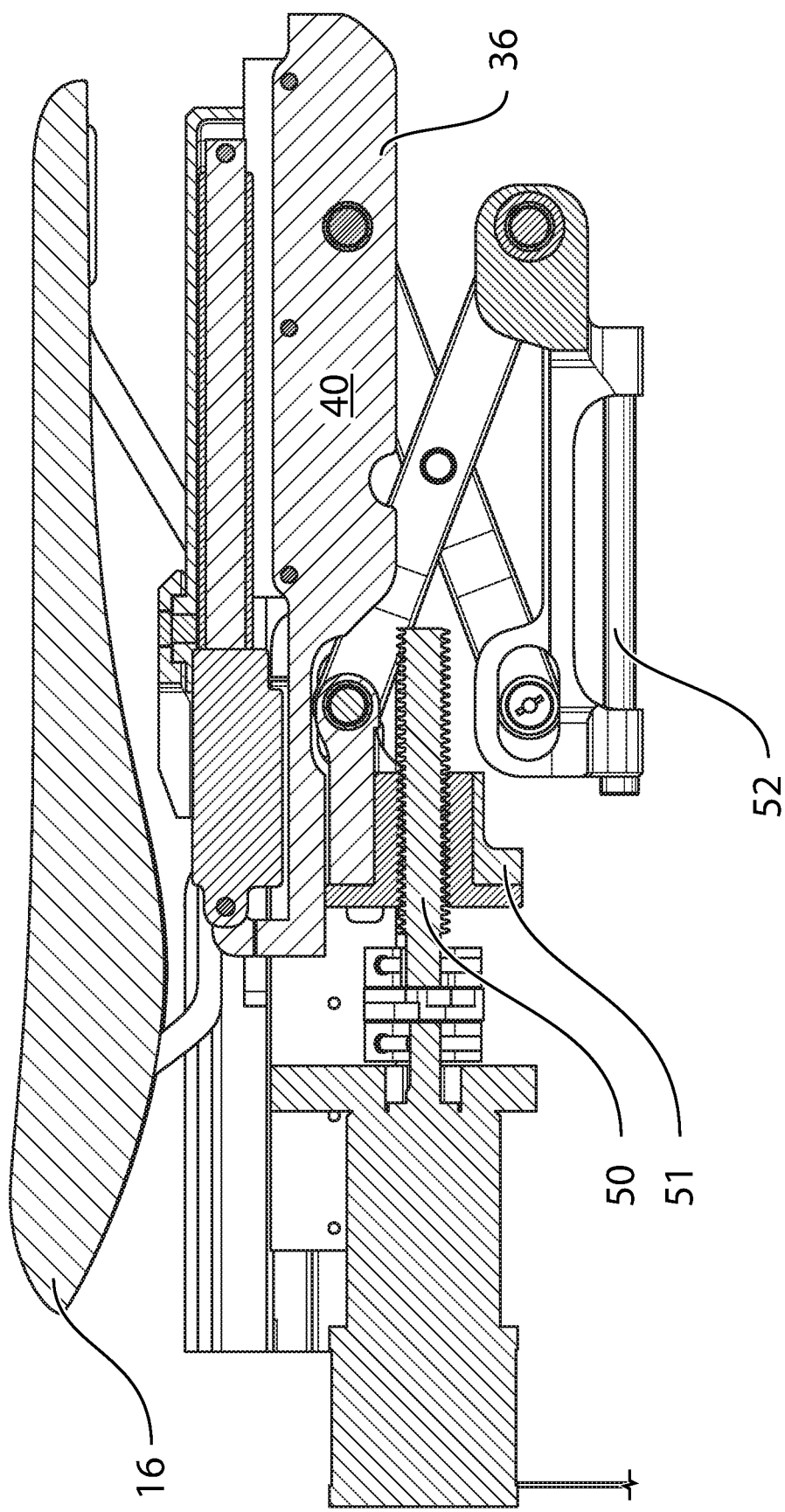
FIG. 3 is side elevation cross-sectional view of the motorized seat post fit device of FIG. 2.
Figure 4:
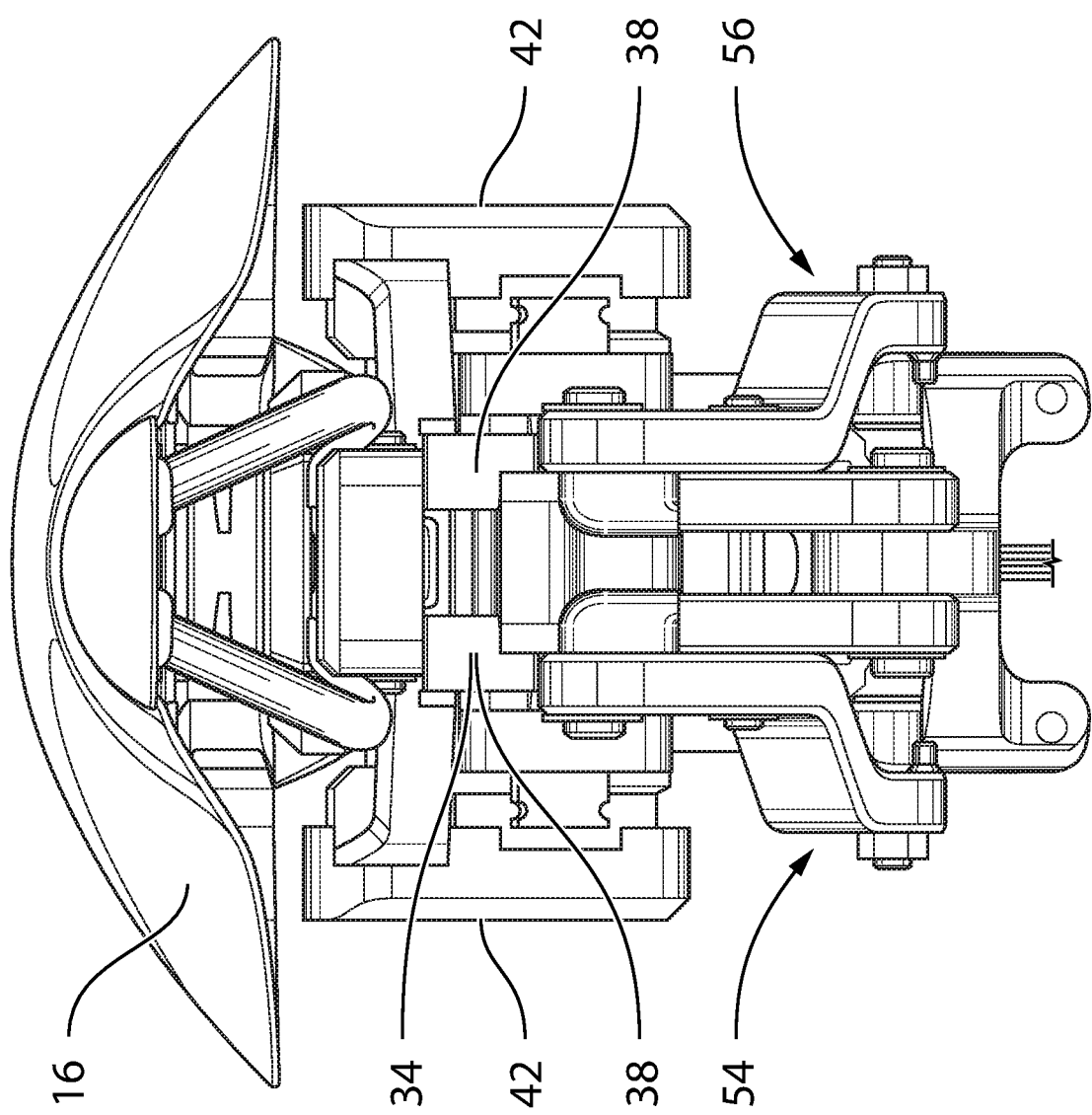
FIG. 4 is a front elevation view of the motorized seat post fit device of FIG. 2.

Referring to the drawings and more particularly to FIG. 1, there is shown a bicycle 12 which has a seat 16 and a seat post 14. The bicycle 12 further includes a stem 13, a head tube 15 and a handlebar 17.

Referring now to FIGS. 2-6, there is shown a motorized seat post fit device 10 in accordance with another embodiment. The motorized seat post fit device 10 is for fitting a cyclist on a bicycle 12. As shown in FIG. 1, the bicycle 12 has a seat post 14 and a seat 16. The seat post 14 to be fitted is known as to be an original seat post which is provided by a seat post manufacturer. The motorized seat post fit device 10 includes a drive assembly 18 and an adjustable seat assembly 20 which is coupled to the drive assembly 18. The adjustable seat assembly 20 provides an interface between the seat post 14 and the seat 16. The drive assembly 18 controls the adjustable seat assembly 20 to provide a vertical displacement 22 and/or a horizontal displacement 24 of the seat 16 relative to the seat post 14.

As shown in FIGS. 2-6, the drive assembly 18 of the motorized seat post fit device 10 includes a motor 26 for controlling the adjustable seat assembly 20 to provide the vertical displacement 22 of the seat 16 relative to the seat post 14. Furthermore, the drive assembly 18 includes an actuator 28 for controlling the adjustable seat assembly 20 to provide the horizontal displacement 24 of the seat 16 relative to the seat post 14.

Figure 5:
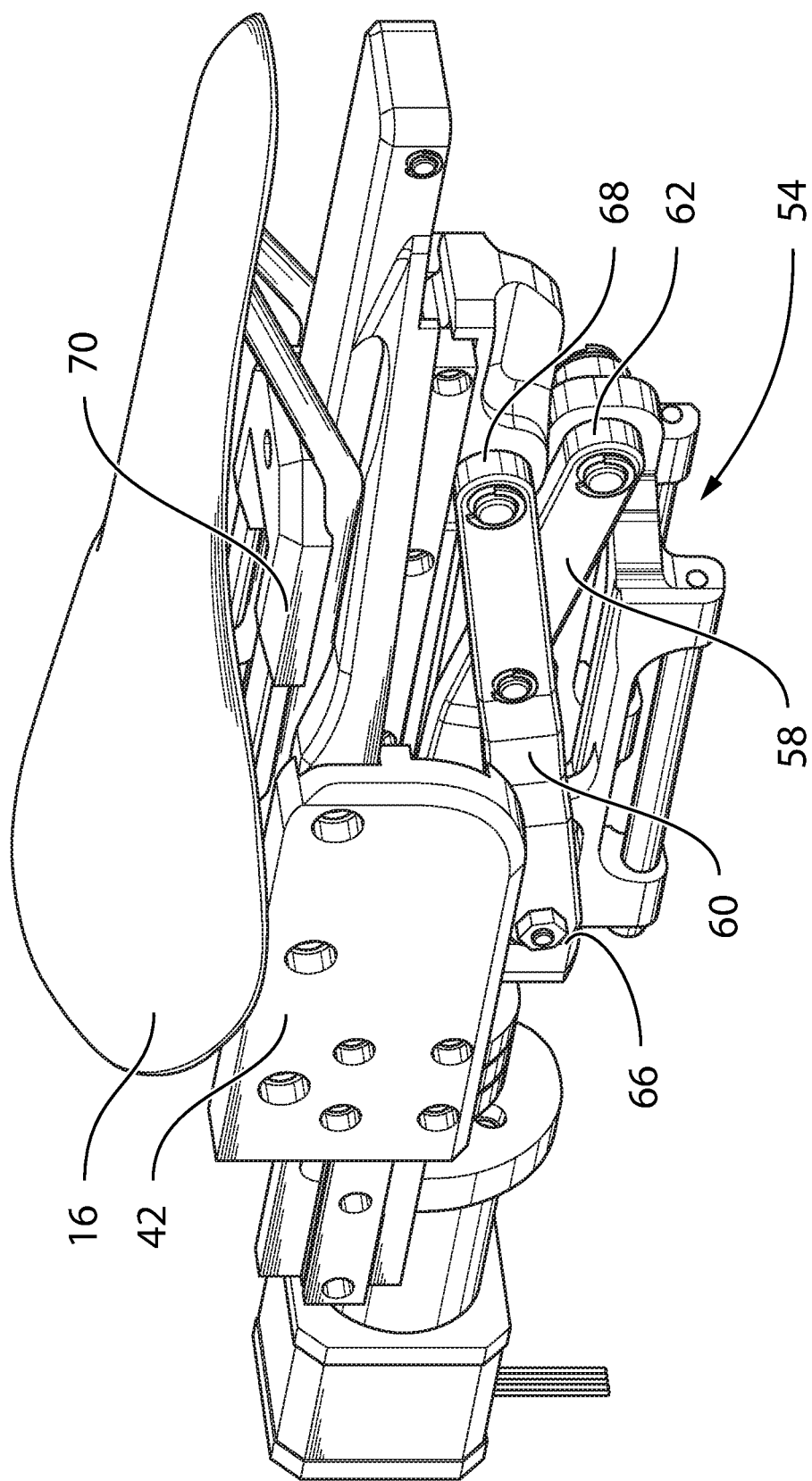
FIG. 5 is a perspective view of the motorized seat post fit device of FIG. 2, where the x coordinate (horizontal displacement) is at its maximum and the y coordinate (vertical displacement) is at its minimum.

The adjustable seat assembly 20 includes a horizontal adjustable seat assembly 30. The horizontal adjustable seat assembly 30 includes a seat mounting element 32 which is for releasably receiving the seat 16. The horizontal adjustable seat assembly 30 further includes a sliding element 34 slidably mounted at least partially below the seat mounting element 32 for slidably receiving the actuator 28 therein. The actuator 28 is being horizontally displaceable between a non-elongated position (FIG. 6) and an elongated position (FIG. 5). In use, when the actuator 28 horizontally moves between its non-elongated position and its elongated position, the sliding element 34 horizontally moves with the actuator 28, thereby horizontally displacing the seat 16 releasably mounted on the seat mounting element 32 relative to the seat post 14.

The adjustable seat assembly 20 further includes a vertical and horizontal interfacing mounting element 36 mounted on the sliding element 34 at least partially below the seat mounting element 32 for providing an interface between the horizontal adjustable seat assembly 30 and a vertical adjustable seat assembly 44.

As shown, the sliding element 34 includes parallel sliding bars 38. Each one of the parallel sliding bars 38 is slidably mounted at least partially below the seat mounting element 32 for slidably receiving the actuator 28 in between the parallel sliding bars 38.

The vertical and horizontal interfacing mounting element 36 further includes a main portion 40 for interfacing between the sliding element 34 of the horizontal adjustable seat assembly 30 and the vertical adjustable seat assembly 44 and an external cover 42. The external cover 42 is slidably mounted on the main portion 40 of the vertical and horizontal interfacing mounting element 36.

Figure 6:
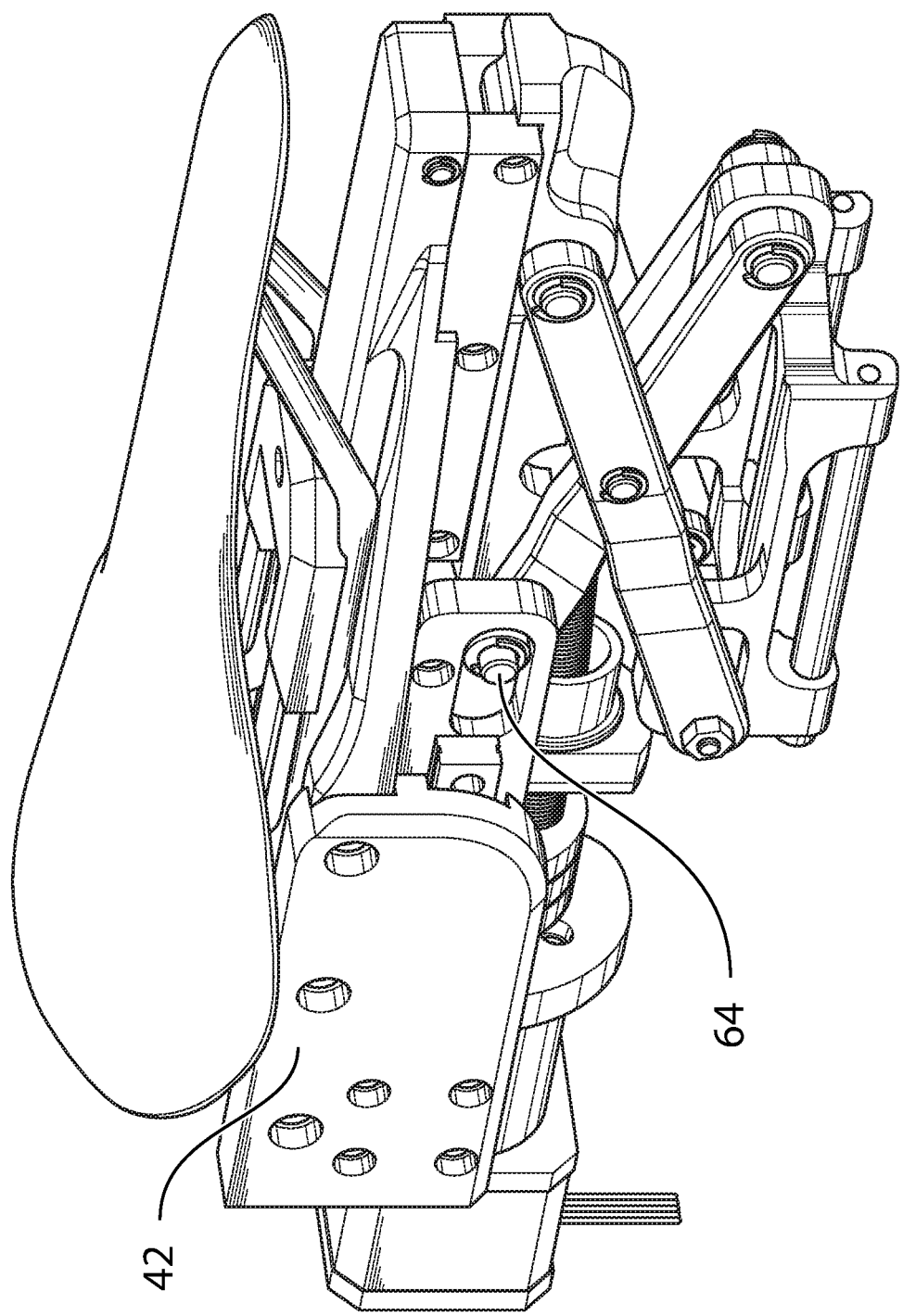
FIG. 6 is another perspective view of the motorized seat post fit device of FIG. 2, where the x coordinate (horizontal displacement) is at its minimum and the y coordinate (vertical displacement) is at its maximum.

As shown in FIGS. 2-6, the adjustable seat assembly 20 includes the vertical adjustable seat assembly 44. The vertical adjustable seat assembly 44 includes a seat post mounting element 46 to be releasably mounted on the seat post 14 and a scissor element 48. The scissor element 48 is pivotally mounted at least partially above the seat post mounting element 46. The vertical adjustable seat assembly 44 further includes a worm drive 50 which is driven by the motor 26 for controlling the scissor element 48 and thus vertically displacing the seat 16 relative to the seat post 14. The scissor element 48 is vertically displaceable between a non-elongated position (FIG. 5) and an elongated position (FIG. 6). In use, when the worm drive 50, which is embedded in a mobile casing 51, horizontally moves, at least a portion of the scissor element 48 moves between its non-elongated position and its elongated position, thereby vertically displacing the seat 16 relative to the seat post 14 releasably receiving the seat post mounting element 46.

As shown, the seat post mounting element 46 includes seat post rails 52 for releasably receiving the seat post 14 thereon. The scissor element 48 includes a first scissor element 54 and a second scissor element 56. Each one of the first and second scissor element 54, 56 cooperates with the seat post mounting element 46 and the vertical and horizontal interfacing mounting element 36 on respectively one end of the scissor element 48. Each one of the first and second scissor elements 54, 56 includes an internal elongated member 58 and an external elongated member 60 which is pivotally mounted on the internal elongated member 58.

The internal elongated member 58 defines a first end 62 and a second end 64. The internal elongated member 60 pivotally connects with the seat post mounting element 46 at its first end 62 and pivotally connects with the vertical and horizontal interfacing mounting element 36 at its second end 64. On the other hand, the external elongated member 60 defines a first end 66 and a second end 68. The external elongated member 60 connects with the seat post mounting element 46 at its first end 66 for providing a horizontal displacement of the first end 66 relative to the seat post mounting element 46 and pivotally connects with the vertical and horizontal interfacing mounting element 36 at its second end 68.

As shown in FIGS. 2-6, the seat mounting element 32 includes a seat locking bracket 70 for releasably receiving the seat 16.

Figure 7:
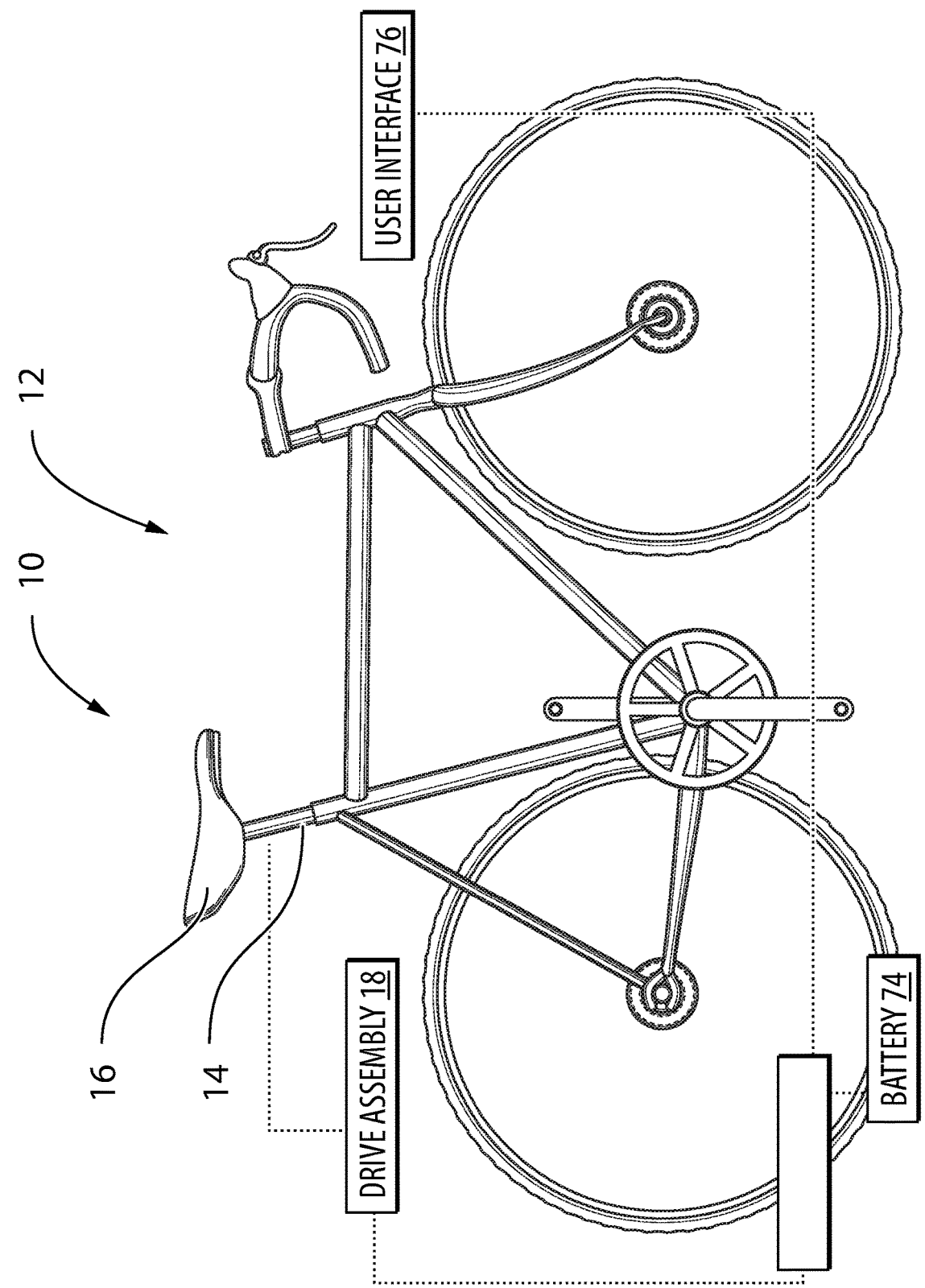
FIG. 7 is a schematic view illustrating a motorized seat post fit device on a bicycle in accordance with another embodiment, where the user interface is electrically coupled to the controller.
Figure 8:
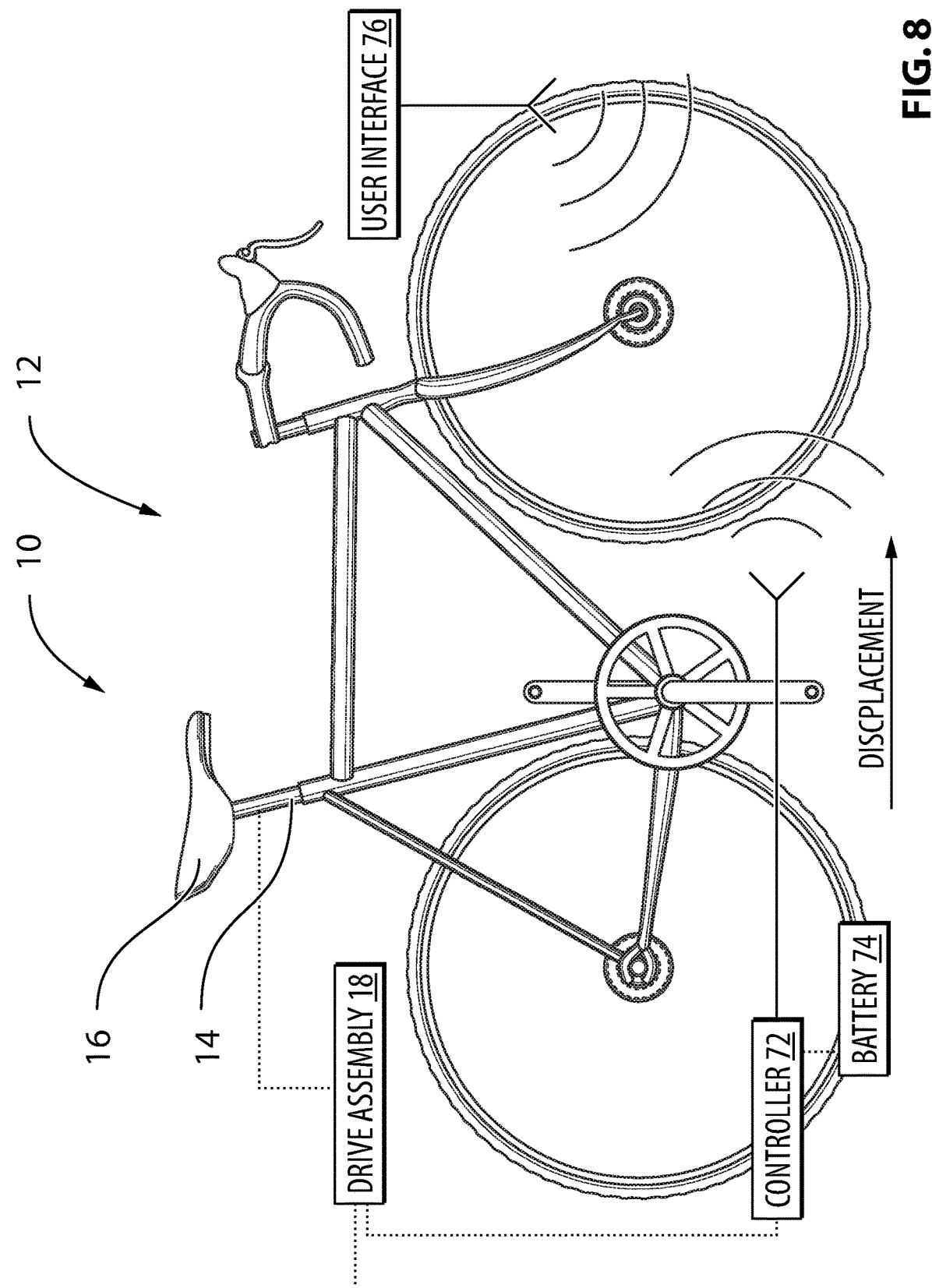
FIG. 8 is a schematic view illustrating a motorized seat post fit device on a bicycle in accordance with another embodiment, where the user interface is coupled to the controller via a wireless system.
Figure 9:
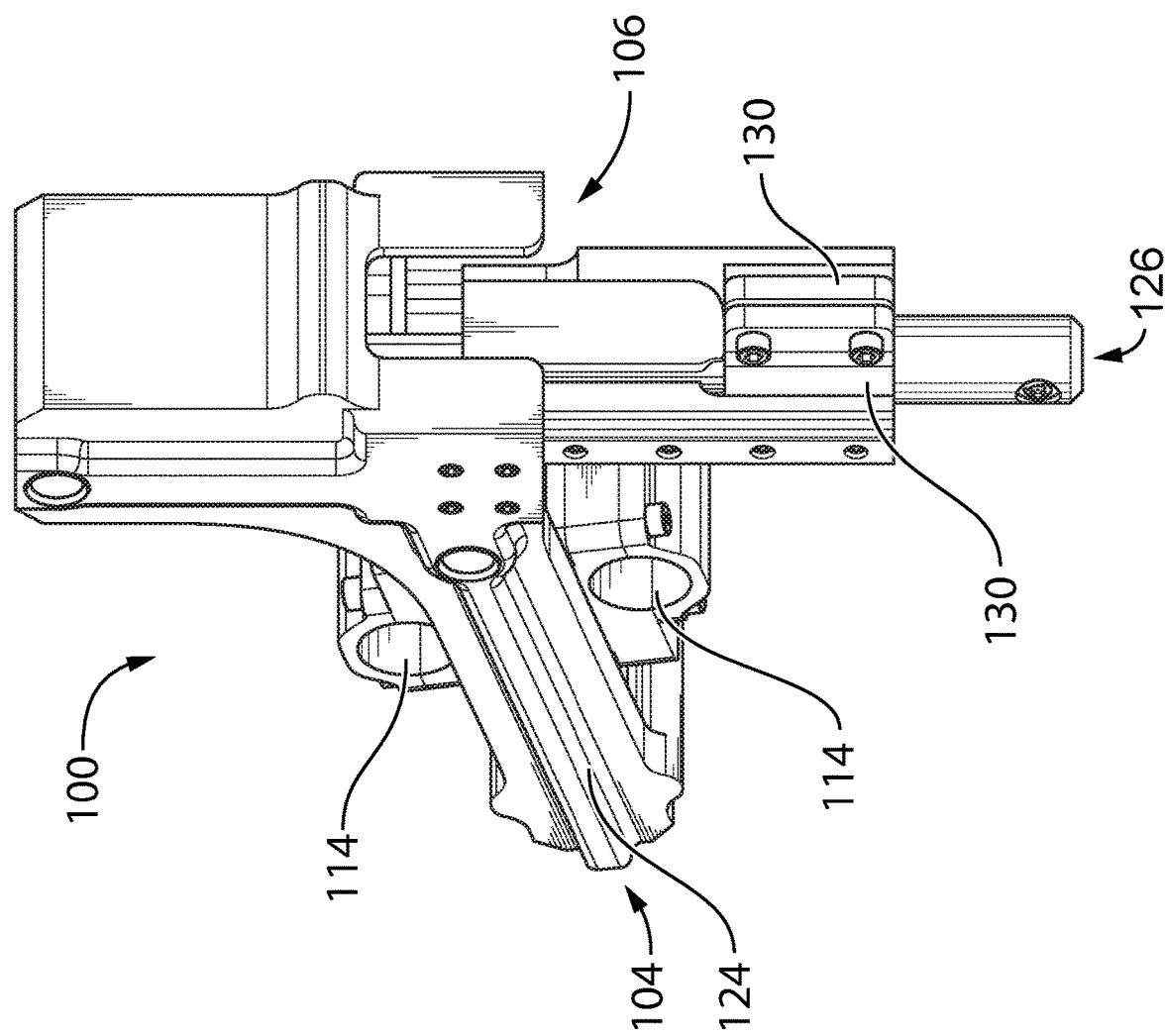
FIG. 9 is a rear perspective view of the motorized stem fit device in accordance with another embodiment.
Figure 10:
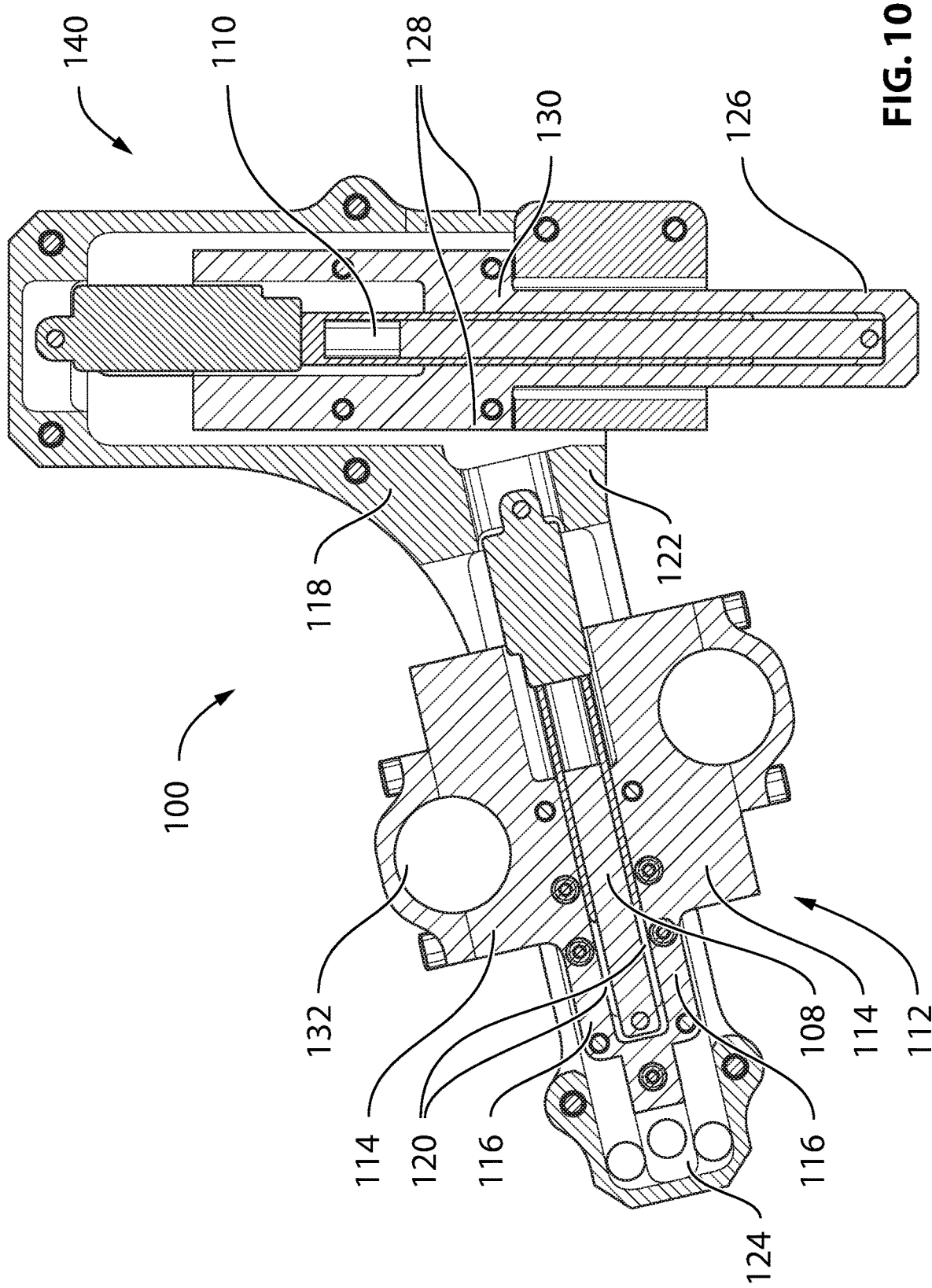
FIG. 10 is a cross sectional side elevation view of the motorized stem fit device of FIG. 9, taken along its longitudinal axis.

Referring now to FIGS. 7-8, there is shown that the motorized seat post fit device 10 may further include a controller 72 which is electrically coupled to the drive assembly 18 for controlling the drive assembly 18 and for collecting coordinates for the vertical displacement and/or the horizontal displacement of the seat 16 relative to the seat post 14. The controller 72 is electrically coupled to the motor 26 and the actuator 28 for controlling the motor 26 and the actuator 28, for collecting coordinates for the vertical displacement and/or the horizontal displacement of the seat 16 relative to the seat post 14. This configuration allows the collection of x and y coordinates (vertical and horizontal displacement) of the seat 16 relative to the seat post 14.

Still referring to FIGS. 7-8, there is shown that the motorized seat post fit device 10 may further include a battery 74 electrically coupled to the controller 72. The motorized seat post fit device 10 may also further include a user interface 76 which is connected to the controller 72 for making selections relating to the motorized seat post fit device 10.

According to one embodiment, the user interface 76 may provide the cyclist with x and y coordinates of the seat 16 relative to the seat post 14 and may allow the cyclist to modify the x and y coordinates (vertical and horizontal displacement) of the seat 16 while riding its bicycle 12.

According to one embodiment, the user interface 76 may be electrically connected to the controller 72 via hard wires (FIG. 7).

According to one embodiment, the user interface 76 may be wirelessly connected to the controller 72 (FIG. 8).

It is understood that specific software may be loaded on the controller 72 so that it may control the drive assembly 18 according to a set of predefined instructions and rules. The software also implements the user interface 76 which is used by the cyclist. The cyclist may also use a device, such as a smart phone as the user interface.

According to another embodiment, and referring now to FIGS. 9-13, there is provided a motorized stem fit device 100 for fitting a cyclist on a bicycle 12. As defined (FIG. 1), the bicycle 12 has a fork steerer (not shown) and handlebars 17. The fork steerer may be an original fork steerer provided by a fork steerer manufacturer. The motorized stem fit device 100 includes a drive assembly 104 and an adjustable stem assembly 106 which is coupled to the drive assembly 104. The adjustable stem assembly 106 provides an interface between the fork steerer and the handlebars 17. The drive assembly 104 controls the adjustable stem assembly 106 to provide a vertical displacement and/or a horizontal displacement of the handlebars 17 relative to the fork steerer. As shown in the vertical and horizontal displacement are not necessarily exactly perpendicular and parallel to the ground. In other words, the words "vertical" and "horizontal" should be interpreted as substantially vertical and substantially horizontal such that they fit devices (seat post and stem) described herein are functionally useful.

The drive assembly 104 includes a horizontal actuator 108 for controlling the adjustable stem assembly 106 to provide the horizontal displacement of the handlebars 17 relative to the fork steerer. The drive assembly 104 further includes a vertical actuator 110 for controlling the adjustable stem assembly 106 to provide the vertical displacement of the handlebars 17 relative to the fork steerer.

Figure 11:
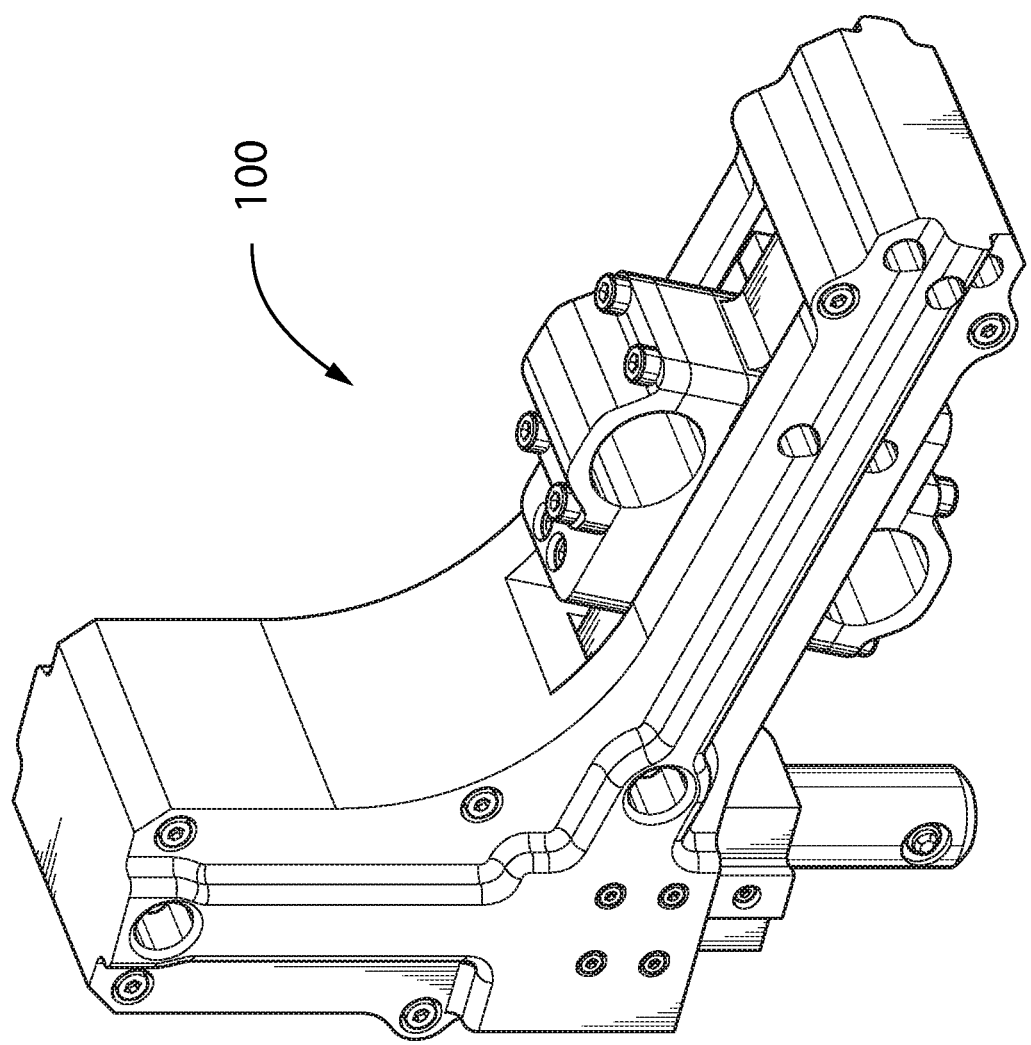
FIG. 11 is a front perspective view of the motorized stem fit device of FIG. 9.
Figure 12:
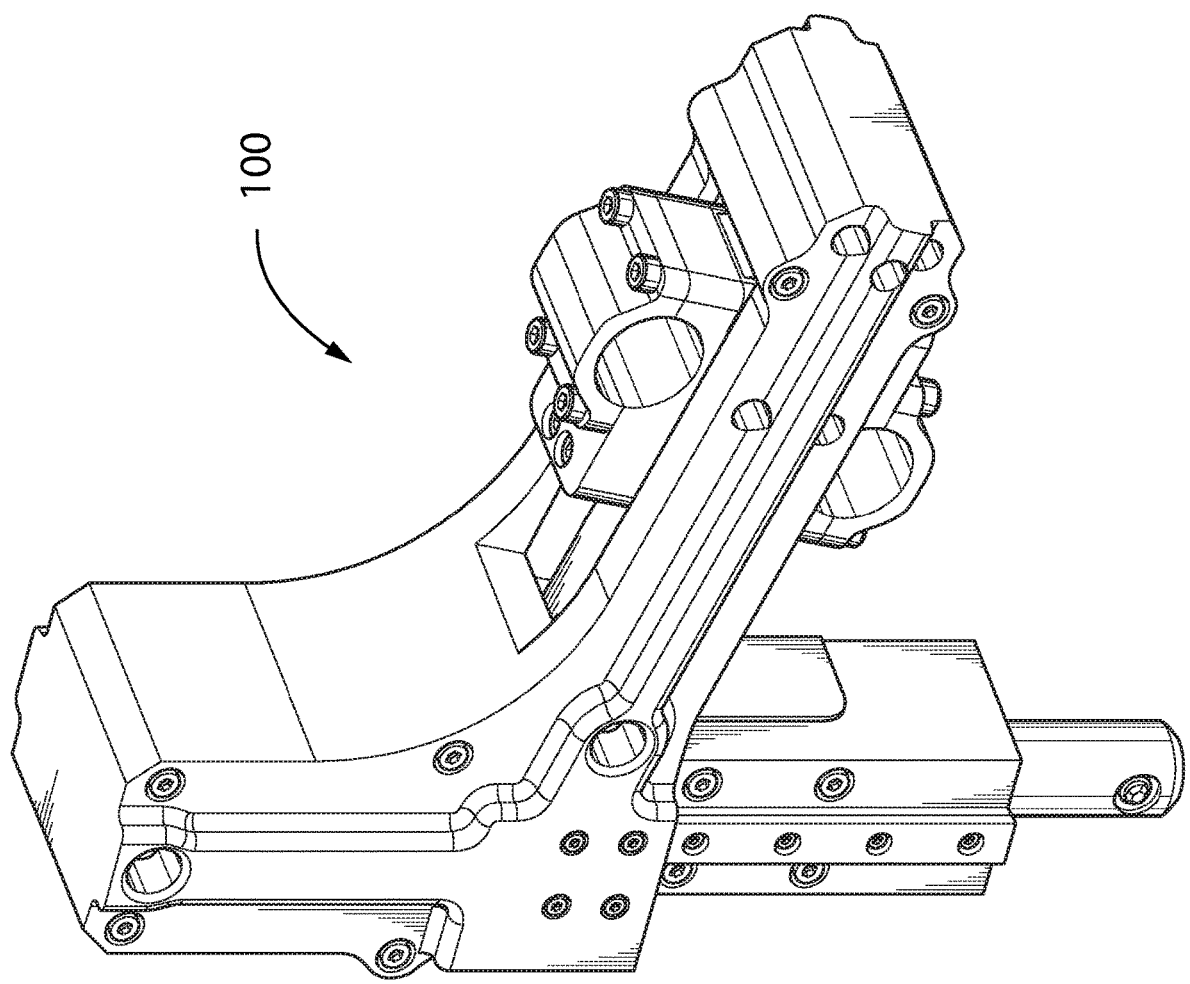
FIG. 12 is another perspective view of the motorized stem fit device of FIG. 9, where the x and y coordinates (vertical and horizontal displacement) are at their maximum.
Figure 13:
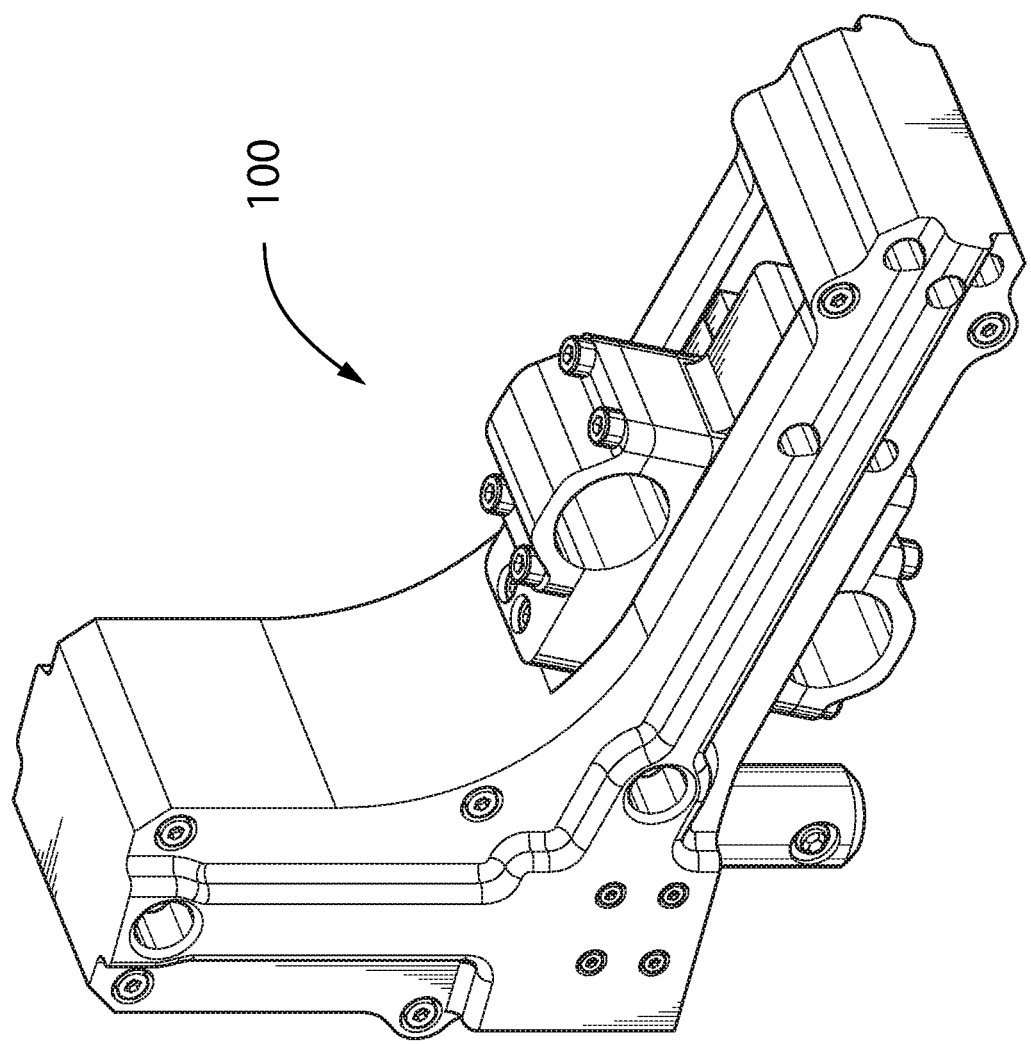
FIG. 13 is another perspective view of the motorized stem fit device of FIG. 9, where the x and y coordinates (vertical and horizontal displacement) are at their minimum.

The adjustable stem assembly 106 includes a horizontal adjustable stem assembly 112. The horizontal adjustable stem assembly 112 includes handlebar mounting element 114 for releasably receiving the handlebars 17 and a sliding element 116 which is slidably mounted to the handlebar mounting element 114 for slidably receiving the horizontal actuator 108 therein. The horizontal actuator 108 is horizontally displaceable between a non-elongated position (FIG. 13) and an elongated position (FIGS. 11 and 12). When the horizontal actuator 108 horizontally moves between its non-elongated position and its elongated position, the sliding element 116 horizontally moves with the horizontal actuator 108, thereby horizontally displacing the handlebars 17 releasably mounted on the handlebar mounting element 114 relative to the fork steerer.

The adjustable stem assembly 106 further includes a vertical and horizontal interfacing mounting element 118 mounted on the sliding element 116 for providing an interface between the horizontal adjustable stem assembly 112 and a vertical adjustable stem assembly 140.

According to one embodiment and as shown, the sliding element 116 includes parallel sliding bars 120. Each one of the parallel sliding bars 120 is slidably mounted on the handlebar mounting element 114 for slidably receiving the horizontal actuator 108 inbetween the parallel sliding bars 120.

The vertical and horizontal interfacing mounting element 118 further includes a main portion 122 for interfacing between the sliding element 116 of the horizontal adjustable stem assembly 112 and the vertical adjustable stem assembly 140 and an external cover 124 slidably mounted on the main portion 122 of the vertical and horizontal interfacing mounting element 118.

The adjustable stem assembly 106 further includes a vertical adjustable stem assembly 140. The vertical adjustable stem assembly 140 includes a fork steerer mounting element 126 to be releasably mounted on the fork steerer and a sliding element 128 slidably mounted to the fork steerer mounting element 126 for slidably receiving the vertical actuator 110 therein. As for the horizontal actuator 108, the vertical actuator 110 is vertically displaceable between a non-elongated position (FIG. 13) and an elongated position (FIG. 12). When the vertical actuator 110 vertically moves between its non-elongated position and its elongated position, the sliding element 128 vertically moves with the vertical actuator 110, thereby vertically displacing the handlebars 17 releasably mounted on the handlebar mounting element 114 relative to the fork steerer.

The sliding element 128 includes parallel sliding bars 130. Each one of the parallel sliding bars 130 is slidably mounted on the fork steerer mounting element 126 for slidably receiving the vertical actuator 110 inbetween the parallel sliding bars 130.

According to one embodiment and as shown, the handlebar mounting element 114 may include a handlebar locking bracket 132 for releasably receiving the handlebars 17.

Figure 14:
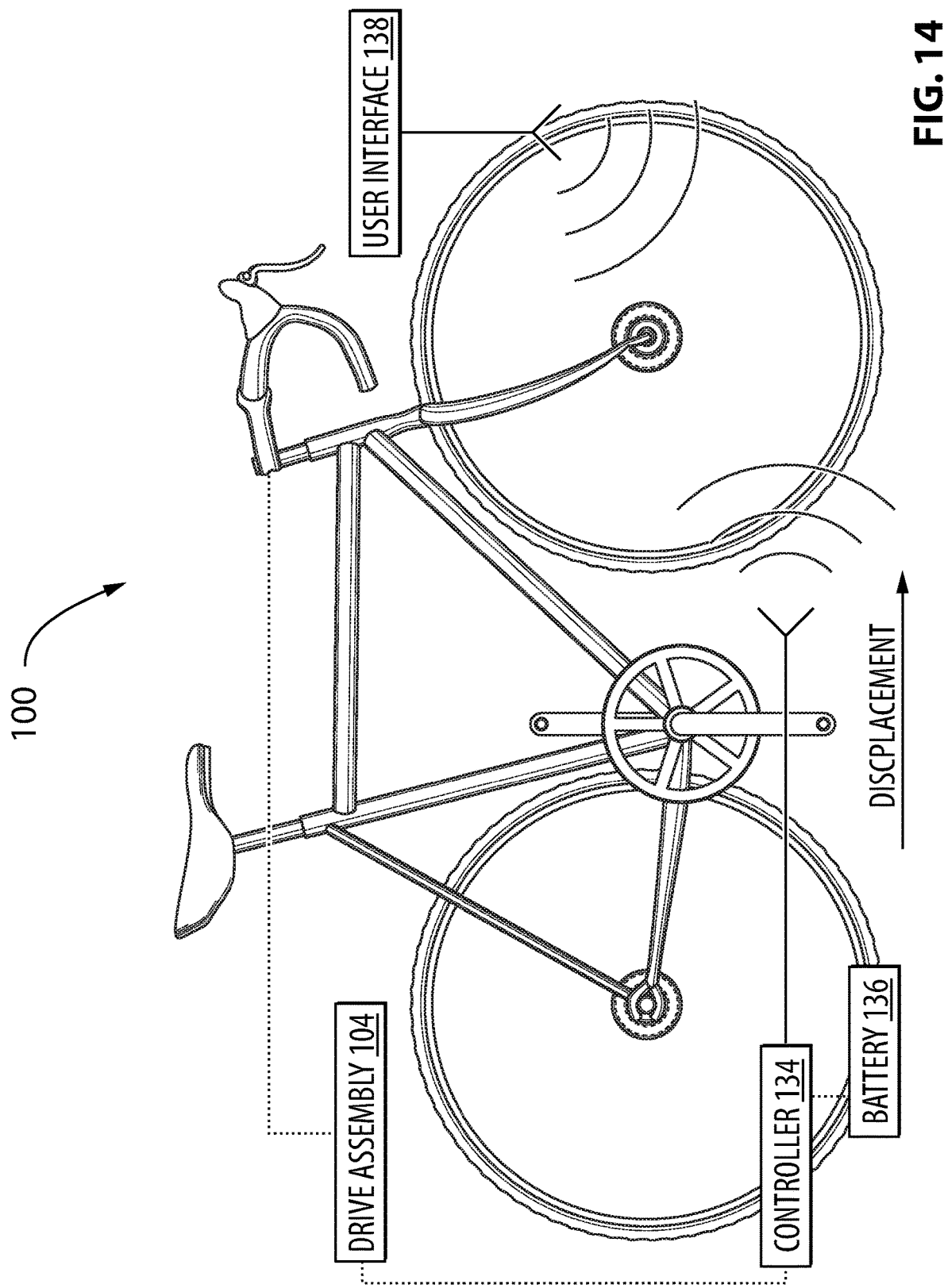
FIG. 14 is a schematic view of a motorized stem fit device installed on a bicycle in accordance with another embodiment.
Figure 15:
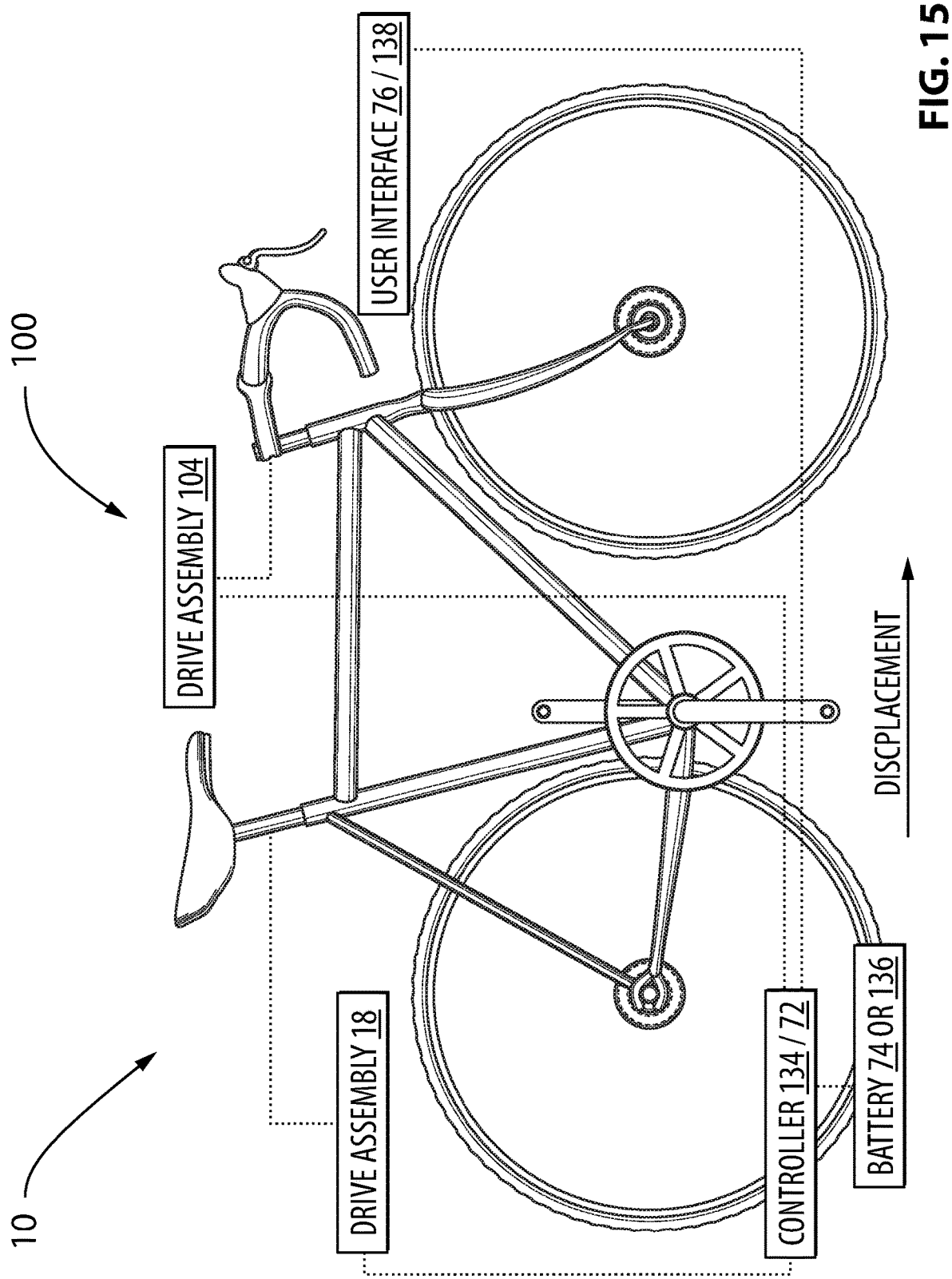
FIG. 15 is a schematic view of a seat and motorized stem fit system in accordance with another embodiment.

Referring now to FIGS. 14-15, there is show that the motorized stem fit device 100 may further include a controller 134 electrically coupled to the drive assembly 104 for controlling the drive assembly 104 and for collecting coordinates for the vertical displacement and/or the horizontal displacement of the handlebars 17 relative to the fork steerer.

The controller 134 may be electrically coupled to the horizontal actuator 108 and the vertical actuator 110 for controlling the horizontal actuator 108 and the vertical actuator 110, for collecting coordinates for the vertical displacement and/or the horizontal displacement of the handlebars 17 relative to the fork steerer, thereby collecting x and y coordinates (vertical and horizontal displacement) of the handlebars 17 relative to the fork steerer.

The motorized stem fit device 100 may further include a battery 136 electrically coupled to the controller 134.

The motorized stem fit device 100 may further include a user interface 138 connected to the controller 134 for making selections relating to the motorized stem fit device 100. The user interface 138 provides the cyclist with x and y coordinates (vertical and horizontal displacement) of the handlebars 17 relative to the fork steerer and allows the cyclist to modify the x and y coordinates (vertical and horizontal displacement) of the handlebars 17 while riding its bicycle 12. The user interface 138 may be electrically connected to the controller 134 via hard wires according to one embodiment. The user interface 138 may be wirelessly connected to the controller 134 in accordance with another embodiment.

According to another embodiment and referring now to FIG. 15, there is shown a motorized stem and seat post fit system 200 for fitting a cyclist on a bicycle 12. The motorized stem and seat post fit system 200 includes a motorized seat post fit device 10 as described above and a motorized stem fit device 100 as described above for allowing a user to modify the positions of its handlebars 17 and seat 16 on the fly.

The devices, kit and system will allow a cyclist to perform a fit session on his bicycle and actually ride on the road to evaluate the fit. The devices could be used in a stationary setting (bicycle shop or at home) to predefine ideal positions based on different fitting protocols. Those positions could then be experienced and validated on the road in displacement by toggling between through a computerized interface (user interface on the bicycle 12 or in a nearby environment).

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A motorized stem fit device for fitting a cyclist on a bicycle, the bicycle having a fork steerer and handlebars, the fork steerer being an original fork steerer provided with the bicycle, the motorized stem fit device comprising:
   a drive assembly; and
   an adjustable stem assembly coupled to the drive assembly and providing an interface between the fork steerer and the handlebars;
   wherein the drive assembly controls the adjustable stem assembly to provide at least one of: a vertical displacement and a horizontal displacement of the handlebars relative to the fork steerer.

2. The motorized stem fit device of claim 1, wherein the drive assembly comprises a horizontal actuator for controlling the adjustable stem assembly to provide the horizontal displacement of the handlebars relative to the fork steerer.

3. The motorized stem fit device of claim 2, wherein the adjustable stem assembly comprises a horizontal adjustable stem assembly, the horizontal adjustable stem assembly comprising:
   a handlebar mounting element for releasably receiving the handlebars;
   a sliding element slidably mounted to the handlebar mounting element for slidably receiving the horizontal actuator therein, the horizontal actuator being horizontally displaceable between a non-elongated position and an elongated position;
   wherein when the horizontal actuator horizontally moves between its non elongated position and its elongated position, the sliding element horizontally moves with the horizontal actuator, thereby horizontally displacing the handlebars releasably mounted on the handlebar mounting element relative to the fork steerer.

4. The motorized stem fit device of claim 3, wherein the sliding element comprises parallel sliding bars, each one of the parallel sliding bars being slidably mounted on the handlebar mounting element for slidably receiving the horizontal actuator in between the parallel sliding bars.

5. The motorized stem fit device of claim 3, wherein the adjustable stem assembly further comprises a vertical and horizontal interfacing mounting element mounted on the sliding element for providing an interface between the horizontal adjustable stem assembly and a vertical adjustable stem assembly.

6. The motorized stem fit device of claim 5, wherein the vertical and horizontal interfacing mounting element further comprises:
   a main portion for interfacing between the sliding element of the horizontal adjustable stem assembly and the vertical adjustable stem assembly; and
   an external cover slidably mounted on the main portion of the vertical and horizontal interfacing mounting element.

7. The motorized stem fit device of claim 3, wherein the handlebar mounting element comprises a handlebar locking bracket for releasably receiving the handlebars.

8. The motorized stem fit device of claim 1, wherein the drive assembly comprises a vertical actuator for controlling the adjustable stem assembly to provide the vertical displacement of the handlebars relative to the fork steerer.

9. The motorized stem fit device of claim 8, wherein the adjustable stem assembly comprises a vertical adjustable stem assembly, the vertical adjustable stem assembly comprising:
   a fork steerer mounting element to be releasably mounted on the fork steerer; and
   a sliding element slidably mounted to the fork steerer mounting element for slidably receiving the vertical actuator therein, the vertical actuator being vertically displaceable between a non-elongated position and an elongated position;
   wherein when the vertical actuator vertically moves between its non elongated position and its elongated position, the sliding element vertically moves with the vertical actuator, thereby vertically displacing the handlebars.

10. The motorized stem fit device of claim 9, wherein the sliding element comprises parallel sliding bars, each one of the parallel sliding bars being slidably mounted on the handlebar mounting element for slidably receiving the vertical actuator in between the parallel sliding bars.

11. The motorized stem fit device of claim 9, further comprising a controller electrically coupled to the drive assembly for controlling the drive assembly and for collecting coordinates for the at least one of: a vertical displacement and a horizontal displacement of the handlebars relative to the fork steerer.

12. The motorized stem fit device of claim 11, wherein the drive assembly comprises a horizontal actuator for controlling the adjustable stem assembly to provide the horizontal displacement of the handlebars relative to the fork steerer and further wherein the controller is electrically coupled to the horizontal actuator and the vertical actuator for controlling the horizontal actuator and the vertical actuator, for collecting coordinates for the at least one of: a vertical displacement and a horizontal displacement of the handlebars relative to the fork steerer, thereby collecting x and y coordinates of the handlebars relative to the fork steerer.

13. The motorized stem fit device of claim 12, further comprising a battery electrically coupled to the controller.

14. The motorized stem fit device of claim 12, further comprising a user interface connected to the controller for making selections relating to the motorized stem fit device.

15. The motorized stem fit device of claim 14, wherein the user interface provides the cyclist with x and y coordinates of the handlebars relative to the fork steerer and allows the cyclist to modify the x and y coordinates of the handlebars while riding its bicycle.

16. The motorized stem fit device of claim 14, wherein the user interface is electrically connected to the controller via hard wires.

17. The motorized stem fit device of claim 14, wherein the user interface is wirelessly connected to the controller.

18. A motorized stem and seat post fit system for fitting a cyclist on a bicycle, the bicycle having a fork steerer, handlebars, a seat and a seat post, the seat post being an original seat post provided by a seat post manufacturer, the fork steerer being an original fork steerer provided by a fork steerer manufacturer, the motorized stem and seat post fit system comprising:
   a motorized seat post fit device comprising:
      a drive assembly; and
      an adjustable seat assembly coupled to the drive assembly and providing an interface between the seat post and the seat;
   wherein the drive assembly controls the adjustable seat assembly to provide at least one of: a vertical displacement and a horizontal displacement of the seat relative to the seat post; and
   a motorized stem fit device comprising:
      a drive assembly; and
   an adjustable stem assembly coupled to the drive assembly and providing an interface between the fork steerer and the handlebars; wherein the drive assembly controls the adjustable stem assembly to provide at least one of: a vertical displacement and a horizontal displacement of the handlebars relative to the fork steerer.

* * * * *